US009203895B1

(12) United States Patent
Sauer et al.

(10) Patent No.: US 9,203,895 B1
(45) Date of Patent: Dec. 1, 2015

(54) SYSTEM AND METHOD FOR LATERAL CONNECTION BETWEEN INTERFACE DEVICES WITH BYPASS OF EXTERNAL NETWORK

(71) Applicant: CADENCE DESIGN SYSTEMS, INC., San Jose, CA (US)

(72) Inventors: Christian Sauer, Hosena (DE); Hans-Peter Loeb, Munich (DE); Frank Martin, Glasgow (GB)

(73) Assignee: Cadence Design Systems, Inc., San Jose, CA (US)

( * ) Notice: Subject to any disclaimer, the term of this patent is extended or adjusted under 35 U.S.C. 154(b) by 457 days.

(21) Appl. No.: 13/692,572

(22) Filed: Dec. 3, 2012

(51) Int. Cl.
*G06F 15/16* (2006.01)
*H04L 29/08* (2006.01)
*G06F 17/50* (2006.01)

(52) U.S. Cl.
CPC ............ *H04L 67/10* (2013.01); *G06F 17/5009* (2013.01); *G06F 17/5022* (2013.01)

(58) Field of Classification Search
CPC .................. G06F 17/5009; G06F 17/5022
USPC .................................................. 709/223, 230
See application file for complete search history.

(56) References Cited

U.S. PATENT DOCUMENTS 8,254,408 B2 * 8/2012 Stine ..................... H04L 45/60
370/401
8,345,712 B2 * 1/2013 Sood ................. H04L 29/12396
370/349
2005/0240675 A1* 10/2005 Caspers .................. H04L 12/66
709/230
2013/0332140 A1* 12/2013 Garg .................... G06F 17/5009
703/21

OTHER PUBLICATIONS

J. Suzuki, Y. Hidaka, J. Higuchi, T. Yoshikawa, A. Iwata, ExpressEther—Ethernet Based Virtulization Technology for Reconfigurable Hardware Platform, System Platform Research Labs, NEC, 14th IEEE High-Performance Interconnects Symposium (HOTI '06), 2006.
J.Y. Hui, D. Daniel, Pcion Inc., PCI over Ethernet and Internet, Presentation at the Ethernet Summit, Mar. 2011.
EzChip Technologies, Inc., NP-4 100-Gigabit Network Processor for Carrier Ethernet Applications, Product Brief, Campbell, CA, 2011.
V. Krishnan, Dolphin Inc., Towards an Integrated IO and Clustering Solution using PCI Express, IEEE Int. Conference on Cluster Computing, 2007.

* cited by examiner

*Primary Examiner* — Mohamed Wasel
(74) *Attorney, Agent, or Firm* — Rosenberg, Klein & Lee

(57) ABSTRACT

A system and method are provided for offloaded lateral transmission between protocol interface devices in an electronic system. Such offloading allows the lateral transmission of data and/or instructions between disparate protocol interface devices without burdening the electronic system's resources, such as the primary processor, memory, and/or system bus. A lateral communication controller is provided to intercouple the first and second protocol interface devices and selectively intercept data packets from one device to be injected into another.

28 Claims, 5 Drawing Sheets

SYSTEM AND METHOD FOR LATERAL CONNECTION BETWEEN INTERFACE DEVICES WITH BYPASS OF EXTERNAL NETWORK

BACKGROUND OF THE INVENTION

The subject system and method are generally directed to providing lateral communication between interfaces of a system. The subject system and method generally provide for lateral tunneling and/or bridging between two disparate protocol interface devices in an electronic system, such electronic system may be embodied as a system-on-chip (SOC) integrated circuit. The subject system and method also generally provide for a direct connection between two communication interfaces within an electronic system such that the data of one interface may be intercepted and directly injected into the other's processing paths autonomously without need for involving resources such as the processor or main memory, which includes on-chip resources in the case of an SOC.

Applications of electronic systems such as wireless base stations, server farms, input/output (I/O) virtualization for blade servers, or storage I/O and memory array networking (MeMan) require transport of an I/O communication protocol from a host system such as, for example, a processor cluster, over a backplane into an endpoint/target system. Generally, a backplane protocol and a host system's input/output (I/O) protocol are incompatible.

As processing requirements continuously and exponentially increase, enterprises are starting to find the need to utilize a million computer hosts clustered together to provide concurrent execution of a single program such as the Google search query. The need for increased harmonization, virtualization, and interconnection of potentially millions of processors, computers, hosts, and servers into a single functional unit is becoming increasingly essential. Such server farms hosting potentially hundreds of thousands of servers in one location may forego with separating each server into a separate functional unit and may seek to remove extraneous items such as cases, independent power supplies, independent peripherals, and may instead seek to network or intercouple each individual server together in the most efficient manner possible.

A processor and its peripherals within a server are designed to primarily communicate internally (board-level input/output (IO)) over an internal IO interface such as PCI Express, or the like, whereas network communications between servers generally operate over a separate backplane protocol such as, for example, Gigabit Ethernet. Gigabit Ethernet is primarily used to connect separate host machines, as peers. Contrastingly, an IO protocol, like PCI Express, on the other hand generally connects peripherals, such as storage devices, and other such items to a single host (communication root). The PCI Express format has its own benefits and advantages relative to Gigabit Ethernet. Oftentimes, to get the right balance between performance, robustness, power consumption, and other such features, a system's architect seeks to create new ways of interconnecting hosts and peripherals. In some instances it may prove beneficial to provide a connection of a particular protocol virtually on top of another protocol. For example, a device utilizing PCI Express may be connected to a PCI Express IO interface which rides atop a backplane protocol (such as Gigabit Ethernet) which is connected to a server. The server is thereby provided with a virtual PCI Express interface. Such exemplary connection provides flexibility in cluster architecture by allowing for connecting a plurality of peripherals or external devices for a group of servers via a back plane protocol such as Gigabit Ethernet. As another example, it may be beneficial to network a plurality of servers together via an internal IO protocol, such as PCI Express connections.

As a specific example, a 10 Gigabit per second Ethernet link may support up to 4 PCI Express lanes of 2.5 gigabits per second throughput. Thereby, potentially four separate PCI Express peripherals such as RAID arrays, video cards, and the like may be connected or one big peripheral device such as a big RAID array or memory array network may be connected across an Ethernet link to provide storage or services for a different host.

In another example, Ethernet may be tunneled through a high-speed PCI Express fabric to provide very high performance cluster interconnect suitable for storage input/output. Thereby, large banks of storage such as a RAID array, an array of solid state disks, and the like, may be selectively utilized between a plurality of different host systems and may remain in remote locations.

Conventional attempts to address these needs are less than ideal as they either require dedicated hardware externally disposed at great cost and customized for each protocol interface device pair and/or require the full-time operation of the main processor, memory, and system bus, thereby substantially degrading performance for other intended operations.

There is therefore a need for a system and method for lateral communication between protocol interface devices.

SUMMARY OF THE INVENTION

A lateral communication between interface devices of a system is provided for lateral tunneling and/or bridging between two disparate protocol interface devices in an electronic system. The lateral communication provides for a connection between two communication interfaces within a single system such that the data of one interface can be intercepted and directly injected into the other's processing paths autonomously without need for involving other system resources such as a processor or a main memory.

The disclosed system for lateral tunneling with bypass of an external network from a first protocol interface device to a second protocol interface device includes: A first protocol interface device and a second protocol interface device are respectively operatively coupled to a first and second external physical transmission medium. At least one lateral connection controller intercouples the first and the second protocol interface devices. The lateral connection controller intercepts data segments within the first protocol interface device prior to transmission to the first external physical transmission medium and injects the intercepted data segments into the second protocol interface device.

A method for lateral tunneling with bypass of external network between protocol interfaces includes: establishing a system to include a first and second protocol interface device. Both the first and second protocol interface devices are respectively operably coupled to a first and second external physical transmission medium respectively. At least one lateral connection controller is provided to intercouple the first and second protocol interface devices with bypass of at least one of the first and second external physical transmission media. Data segments are intercepted by the lateral connection controller within the first protocol interface device prior to transmission thereof to the first external physical transmission medium. The intercepted data segments are then injected into the second protocol interface.

Additional aspects and details will be set forth in part in the Description which follows, and, in part, will be apparent from the Description and Figures.

DETAILED DESCRIPTION OF THE PREFERRED EMBODIMENTS

One example of the system and method seeks to provide a method for lateral tunneling between disparate interfaces in an electronic system without overburdening a main processor, memory, and/or bus. A lateral communication is provided to enable offloaded communications between interface devices in the system without burdening the central processor, memory, and/or bus. A system which provides, for example, connection of PCI Express (PCE) peripherals directly to a motherboard or backplane via a Gigabit Ethernet (GbE) connection is provided. Additionally, as another example, GbE hosts may be directly connected to other hosts via PCE. Thereby the advantages of both GbE and PCE may be selectively employed regardless of the host/peripheral interface protocol.

Figure 5:
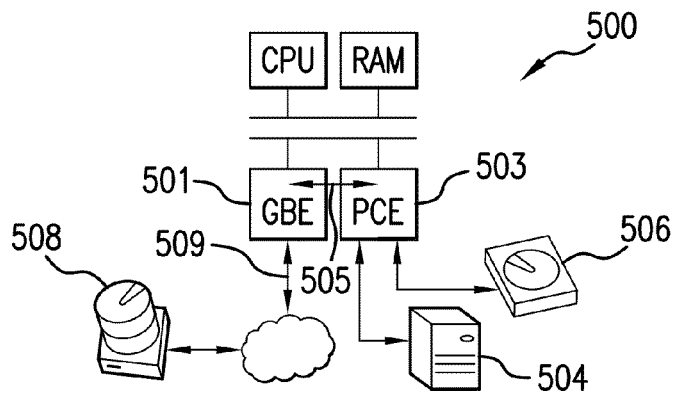
FIG. 5 is yet another block diagram illustrating an exemplary interconnection of components implementing an exemplary configuration of the present invention.

As seen in the illustrative block diagram of FIG. 5, a system 500 with lateral interconnection 505 between a first protocol interface device 501 and a second protocol interface device 503 is provided. The first protocol interface, for example, Gigabit Ethernet (GbE) 501 is provided. A second protocol interface device 503, for example PCI Express (PCE), also referred to as PCIe (Peripheral Component Interconnect Express), used interchangeably herein. In this example, a server or host system 500 has a native input/output (I/O) interface which may generally be PCI Express (PCE) 503. The native I/O interface 503 allows for the connection of peripheral devices such as a Redundant Array of Inexpensive Disks (RAID) controller with hard drives 506, or other devices (not shown) such as a video card, a physics processor, an additional network adapter, and the like. Additionally, a Gigabit Ethernet (GbE) or network interface device 501 is provided as well. The Gigabit Ethernet device 501 generally connects through a network 509 to other servers, hosts, clients, routers, switches, traffic management devices, network attached storage, and the like.

Generally, the externally interfacing protocols of the two interface devices, in this exemplary case, the PCE interface device 503 and the Gigabit Ethernet interface device 501, are incompatible one with the other. They are separate, distinct, and disparate—using their own respective suites of protocols and transmission encoding formats, amongst other differences. Generally, a device meant to be attached to a Gigabit Ethernet interface device 501 may not connect to a PCE interface device 503. Not only are the physical connectors geometrically incompatible, but also, the number of pins, the signaling style, the encoding, the protocols, and the like are complete disparate. Therefore, for example, one may not generally attach a network server to another host's PCE interface device 503. Similarly, one may not generally attach a video card or monitor to a host's Gigabit Ethernet interface device 501.

Advanced server farms or processing clusters, memory area networking (MeMan) applications, and the like, would benefit greatly by transport of their input/output (I/O) communication protocols between host systems such as a processor cluster over a backplane protocol into an endpoint or target system. A backplane generally interconnects computed resources with other, for example, storage resources or processing resources in a scalable and extensible manner. As the backplane protocol and the host system I/O protocol are generally different, disparate, and incompatible, enabling an I/O protocol, such as PCE to tunnel through a backplane protocol, such as GbE, and vice-versa without unduly burdening system resources holds great benefit.

The choice of the backplane protocol generally varies with different manufacturers. For example, in a memory area network, a redundant array of inexpensive disks (RAID) is generally attached through a PCE 503 interface; however, the physical proximity of the RAID device 506 may not be practical, or even possible for a specific application. PCI Express may have, for example, a cable length limitation where a cable may not exceed, e.g. 10 feet. By enabling tunneling of the PCI Express protocol through the Gigabit Ethernet device 501, a RAID array 508 or storage area network may be located virtually anywhere on the planet and still provide quick reliable service to the system 500.

In another illustrative instance, it may be beneficial to allow a direct interconnection between servers or clusters across a PCE 503 interface as opposed to a Gigabit Ethernet interface 501. Such interconnection may provide a plurality of benefits, including taking advantage of advanced error detection and remediation, increased speed, reduced protocol overhead, and the like. Thereby, a host 504 may be connected to another host through a PCI Express interface 503 utilizing a lateral interconnection 505 from the interface 501 through the PCI Express card interface 503 to ultimately interconnect host server 504. In this instance, server 504 would likely have the same configuration, including a Gigabit Ethernet protocol interface device 501 and a PCI Express protocol interface device 503 utilizing a direct lateral connection controller 505 therebetween.

Figure 4:
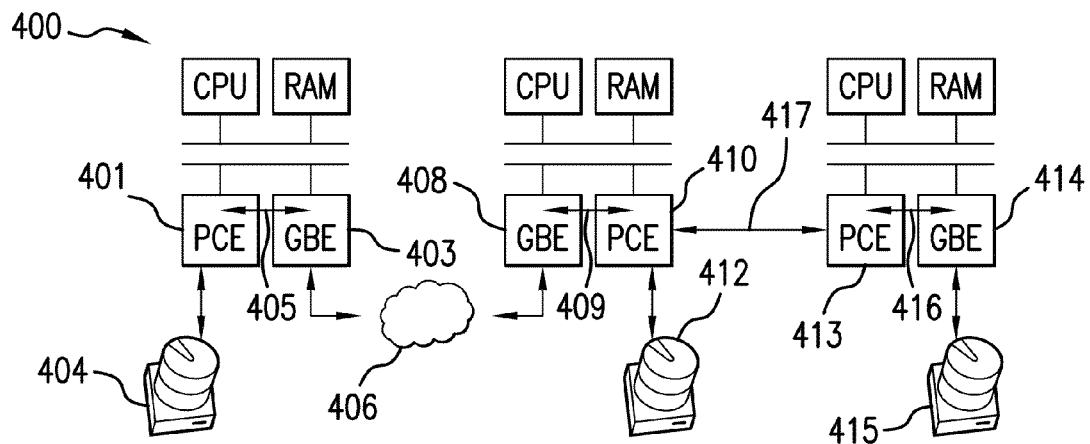
FIG. 4 is another simplified block diagram illustrating an exemplary interconnection of components implementing an exemplary configuration of the present invention.

As seen in FIG. 4, a system 400 with a plurality of hosts interconnected through a series of Gigabit Ethernet and PCI Express links is shown. For example, a RAID controller 404 having a PCI Express interconnection and a plurality of redundant inexpensive disk drives is attached to a first protocol interface device 401, in this case, a PCI Express interface. A direct lateral connection controller 405 interconnects the first protocol interface device 401 to the second protocol interface device 403. In this instance, the second protocol interface device 403 is a Gigabit Ethernet device. The second protocol interface device 403 may be coupled with a first protocol interface device 408 of a second host. Such lateral connection controller 405 may be incorporated into one or the other of the two interface devices with a connection to the other interface device or may be disposed intermediate the two interface devices.

Such interconnection between interface devices 403 and 408 may be a direct Gigabit Ethernet connection, a connection through the internet with potentially very large number of intermediate connections therebetween, or any other known type of interconnection. Gigabit Ethernet, Fiber, Wireless Fidelity (WIFI, such as, for example, 802.11a/b/g/n/ac), Long Term Evolution (LTE), WiMax, WiBro, Zigbee, Infrared, and the like may be used. Indeed, any network protocol or interface standard may be used as would be known to one of skill in the art.

The first protocol interface 408 of the second host is coupled through a direct lateral connection controller 409 to a second protocol interface device 410. In this exemplary instance, the second protocol interface device 410 is a PCI Express controller. Thereby, RAID controller 404 is intercoupled with the first protocol interface device 401 through a PCI Express interface and the lateral communication connection 405 to the second protocol (e.g. Gigabit Ethernet) interface device 403 allows a connection to another host or server via the tunneling of the PCI Express protocol. PCE commands and data may be encapsulated within the Gigabit Ethernet protocol and transmitted across a network such as the internet 406 to another host or machine.

The first protocol (Gigabit Ethernet) interface device 408 of the second host receives the encapsulated PCE data and, after de-capsulating it, transfers the data over another lateral connect 409 to a second protocol interface device 410 (which is, in this example, PCI Express). By this arrangement, the secondary host and the second protocol interface device 410 see the RAID controller and array 404 as a local device such as the RAID controller and array 412. In such manner, the second host may take full advantage of the RAID array 404 even though it may not be in close physical proximity at all to the second host. In a symmetrically corresponding manner, the RAID array 412 or any peripheral interconnected with the second protocol interface device 410 may be seamlessly used by the first host, just as with any local device of that host.

In yet another instance, a PCI Express connection 417 may be made between a second protocol interface device 410 of a second host and another first protocol interface device 413 of a third host, thereby providing a PCI Express to PCI Express connection between the two hosts. A protocol interface device may be provided with one or a plurality of lateral connection controllers. While PCI Express is used to provide the connectivity between the two protocol interface devices 410 and 413, the Gigabit Ethernet protocol devices 408 and 414 will establish a tunnel through the respective lateral connection controllers 409 and 416 to thereby enable a Gigabit Ethernet flow through a PCI Express connection. Thereby, for example, a RAID array 415 disposed remotely at a third host may tunnel through a Gigabit Ethernet protocol interface device 414 through a lateral connection controller 416 to a PCI Express protocol interface device 413, traverse a PCI Express link to a PCI Express interface device 410 in the second host, and then traverse a secondary lateral link controller device 409 to arrive in a Gigabit Ethernet device 408. The CPU in the second host treats the incoming Gigabit Ethernet packets and data as if they originated or were delivered across the Gigabit Ethernet interface device 408, as opposed to the actual PCI Express interface device 410.

Figure 6:
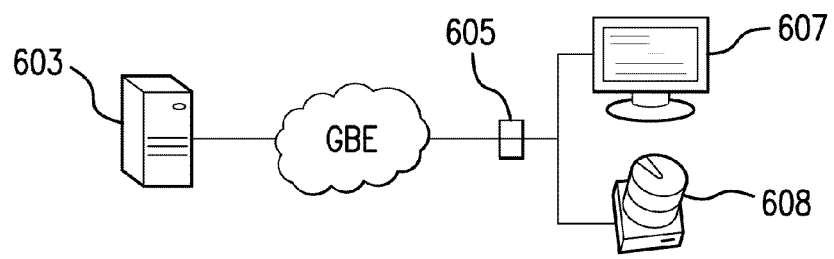
FIG. 6 is a simplified block diagram illustrating another exemplary interconnection of components for implementing an exemplary configuration of the present invention.

As another example, as seen in FIG. 6, a host 603 may be coupled across a Gigabit Ethernet connection to a system on chip (SOC) device or appliance 605 which may itself have a first protocol interface device and a second protocol interface device, where the first device is, for example, a Gigabit Ethernet interface, and the second device may be, for example, a PCI Express interface, Video Graphics Array (VGA) interface, Serial ATA (SATA) interface, Parallel ATA (PATA/IDE) interface, Universal Serial Bus (USB) interface, and any other protocol interface device as would be known to one of skill in the art. By providing a lateral direct interconnection between the two interface devices, a plurality of peripherals or additional devices may be coupled to the server host 603 with a unitary Gigabit Ethernet, WIFI, or other type of interconnection therebetween.

Thereby, for example, a monitor 607 may be coupled to the system on chip device that forms the appliance 605 and which is coupled via Gigabit Ethernet to the server host 603. Additionally, a RAID array 608 may be coupled to the SOC device 605 which is then coupled via a Gigabit Ethernet to the server host 603. In this manner, a plurality of different devices and additional peripherals may be coupled to a remote server host device, though the peripheral or device's native protocol has constraints which cannot be met. For example, the display connection for monitor 607 may have a maximum cable length or other such constraints which are more easily met by utilizing a Gigabit Ethernet or WIFI gateway to thereby interconnect devices.

Figure 2:
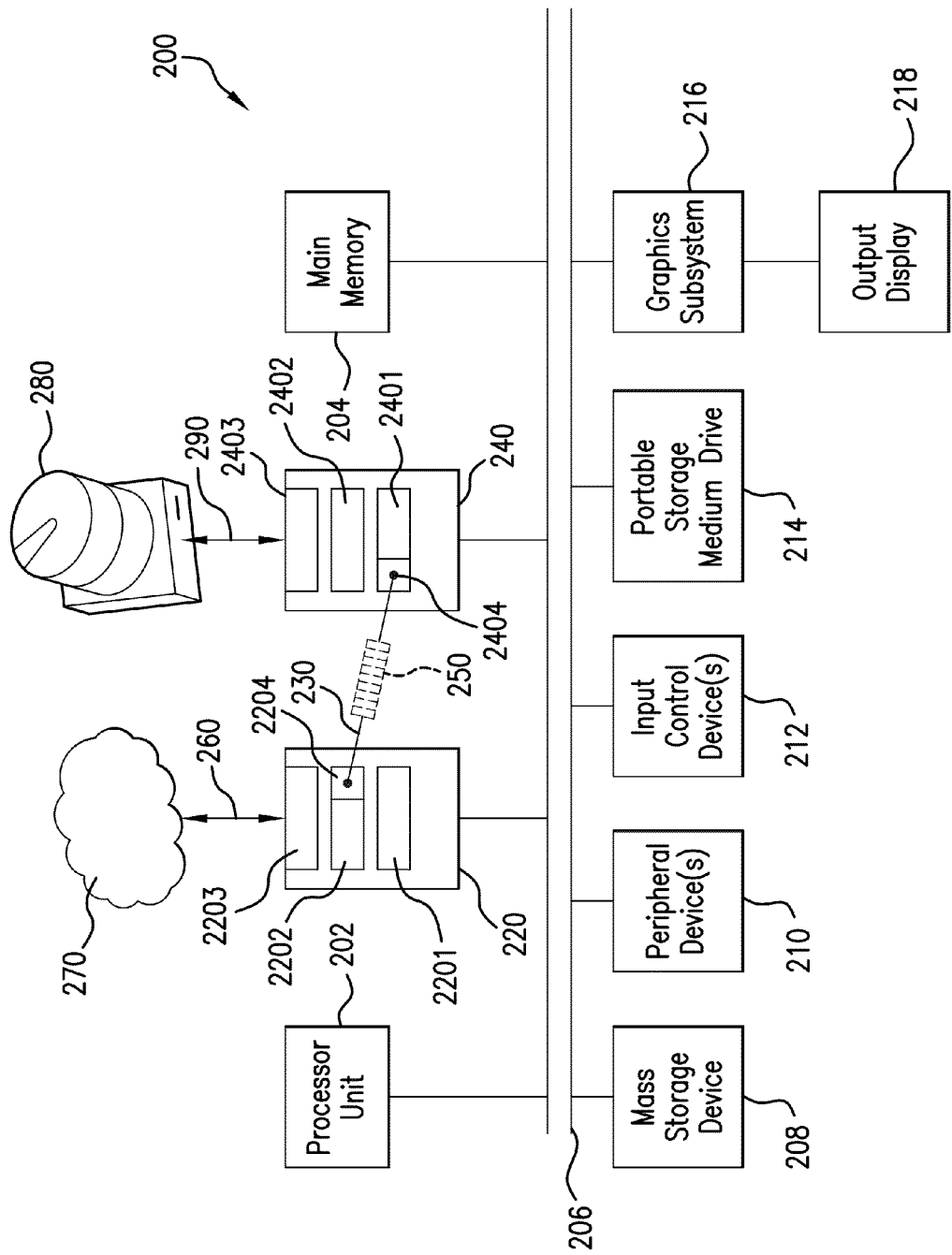
FIG. 2 is a simplified block diagram illustrating an exemplary interconnection of components in a processor-based system for implementing an exemplary configuration of the present invention.

As seen in FIG. 2, a system 200 which may be a server host, a system on chip (SOC), an embedded system, or the like, has a processor unit 202 coupled to a bus 206 to connect to at least a first protocol interface device 220 and a second protocol interface device 240. In this example, the first protocol interface device 220 is a Gigabit Ethernet device. The Gigabit Ethernet device 220 is coupled to a physical transmission medium 260 which is generally a category 5 (Cat 5) or category 6 (Cat 6) Ethernet cable with RJ45 connectors, however, any known physical transmission medium may be used. This external physical transmission medium 260 is coupled on a first end into a receiving jack or port on the Gigabit Ethernet device 220 and may be coupled on an opposing end to a router, switch, hub, another server host, client workstation, or the like. Such connection is illustratively shown as a cloud 270.

The first protocol interface device (Gigabit Ethernet device 220) has a plurality of layers of processing abstraction similar to an Open Systems Interconnect (OSI) model. A first layer 2201 may be a transaction layer which is the most abstracted form for dealing with the device and/or the flow of data segments therethrough. The transaction layer 2201 may receive simple commands from applications or other devices within the system to transmit or form a segment. The transaction layer 2201 then interfaces with a second more detailed layer, data link layer 2202, which may create an envelope to contain data received from the transaction layer 2201 responsive to the instructions or data received from the transaction layer 2201.

Data link layer 2202 then generally transmits a data segment wrapped in at least one envelope to the physical layer 2203 for transmission in the 0 and 1 bit patterns to the external physical transmission media 260. A lateral connection controller 2204 is disposed at the data link layer 2202 in this example. The lateral connection controller 2204 may inspect incoming data segments and/or their envelopes appended thereto by either the transaction layer 2201 or the data link layer 2202. The lateral connection controller 2204 may either indiscriminately send all packets received at the data link layer 2202 to the second protocol interface device 240 (in a promiscuous mode) or may exercise some selectivity such as an evaluation of an envelope, the addressee, a priority, a quality-of-service (QOS), and the like (in a selective mode). Modes may be switched by appropriate commands issued as a signal, data packet, or, dedicated mode selector lines may be suitably established.

The lateral connection controller 2204 may be disposed in any of the networking layers (e.g. 2201, 2202, or 2203) depending on the amount of encapsulation to be provided by the pre-existing first protocol interface device 220 relative to the lateral communication controller 2204. If, for example, a lesser degree of encapsulation, parameter filling, and addressing from the layer is desired, the lateral communication controller 2204 may be disposed in the transaction layer 2201. However, the lateral communication controller 2204 will then need to perform such encapsulation with its own processing and memory resources.

The lateral communication controller 2204 may be disposed in the first protocol interface device 220, the second protocol interface device 240, and/or may be disposed between the two at an intermediate location 250. Alternatively, lateral communication controller 2204 can be split up into a plurality of portions and disposed in a distributed manner. Location 250 of the lateral communication controller 2204 may include a plurality of buffers, a multiplexer, and/or a small system on chip (SOC) for evaluating packets, data segments, or frames and selectively transmitting them laterally rather than allowing them to proceed to the external transmission medium 260 or 290 as the case may be.

In a first instance, the lateral communication controller 2204 acts to intercept data segments traversing through the first protocol interface device 220 and selectively reroute them to the second protocol interface device 240. The rerouted data segments may be directly injected into a memory autonomously by the lateral communication controller device 2204. The second protocol interface device 240 also has a plurality of layers resembling the OSI networking layer model type approach as discussed above. The second protocol interface device 240 has, for purposes of simplicity, a transaction layer 2401, a data link layer 2402, and a physical layer 2403, while other layers or abstractions may well be possible as would be known to one of skill in the art.

It is illustrated that the lateral communication controller 2204 provides a direct link 230 to another lateral communication controller 2404 in this example for providing bi-directional lateral communication. The lateral communication controller 2404 may be disposed in the second protocol interface device 240. Thereby, the two disparate protocol interface devices 220 and 240 are able to directly communicate laterally between each other without burdening the system bus 206, the processor unit 202, or the main memory unit 204. The remainder of the system 200 thereby remains free to proceed with other processing or IO tasks while the first and second protocol interface devices 220 and 240 semi-autonomously communicate, exchange, and tunnel amongst themselves. The second protocol interface device 240 is provided with an external physical transmission medium 290 to allow it to interconnect with peripherals such as a RAID array 280.

Figure 3:
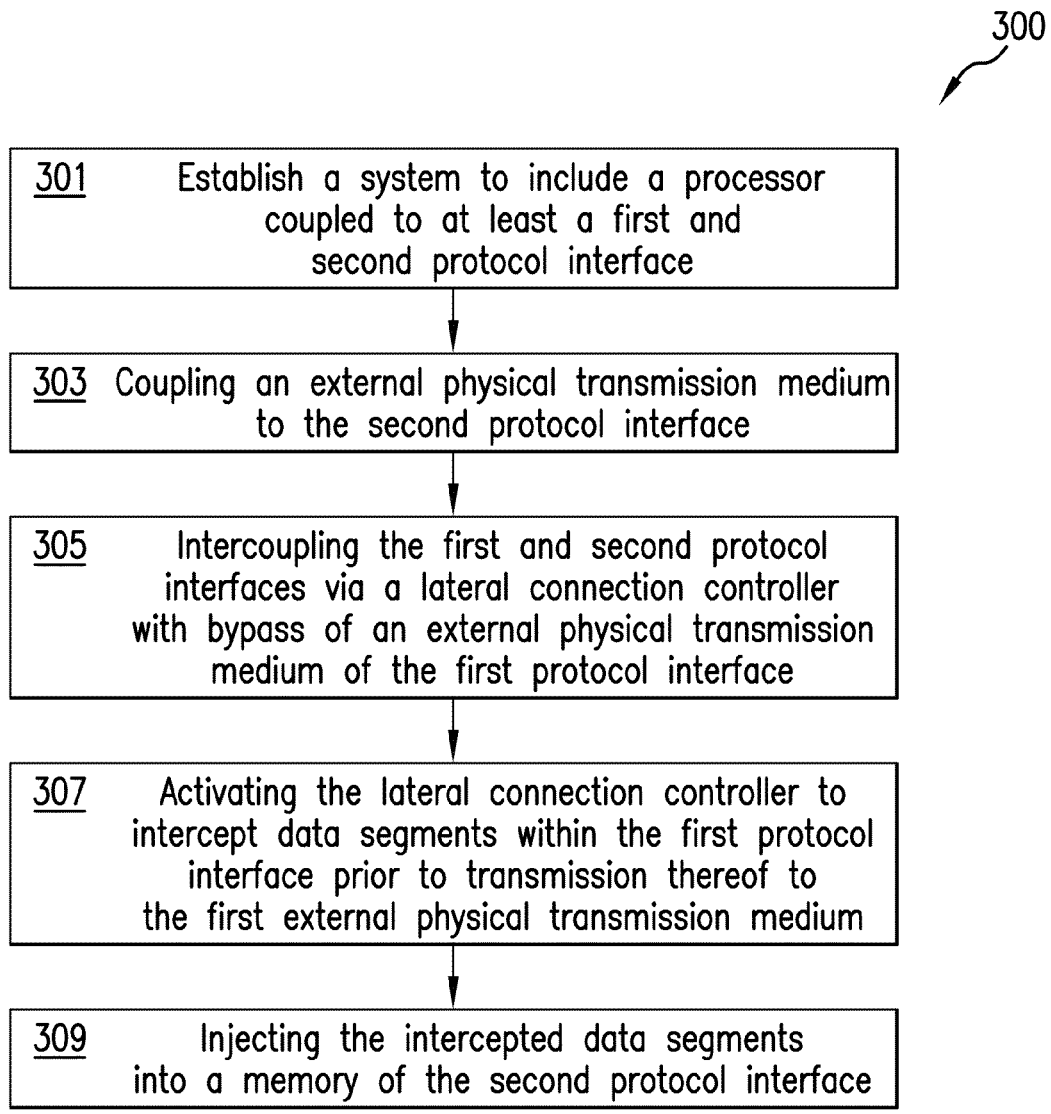
FIG. 3 is a flow diagram illustrating another exemplary configuration of the present invention.

As seen in FIG. 3, a method 300 for establishing a lateral connection between protocol interface devices is shown. At block 301, a system is established to include a processor which is coupled to at least a first and second protocol interface device. For example, the first protocol interface device may be a Gigabit Ethernet, a wireless interface, a fiber optic interface, and the like. The second protocol interface device may be a PCI Express, a USB 3.0, serial ATA interface device, and the like.

At block 303, an external physical transmission medium is coupled to at least the second protocol interface device. At block 305, the first and second protocol interfaces are intercoupled via a lateral connection controller with bypass of the external physical transmission medium of the first protocol interface device.

At block 307, the lateral connection controller is actuated to intercept data segments within the first protocol interface device prior to transmission thereof to the first external physical transmission medium coupled to the first protocol interface device. At block 309, the intercepted data segments are injected by the lateral connection controller into a memory or processing flow of the second protocol interface. Thereby, it is seen that data segments intended for outbound transmission across the first protocol interface device have been effectively rerouted via the lateral connection controller through the second protocol interface device for transmission across its external transmission medium. Use of the semi-autonomous direct lateral connection controller obviates the use of the processing unit, main memory, and at least the system bus. Thereby, the processor, memory, and bus may potentially stay in low power or hibernate-type modes while the first and second protocol interface devices function semi-autonomously in transferring data segments therebetween. Alternatively, the processor, memory, and/or bus may be utilized for other processing and/or IO tasks concurrent with the lateral transmissions.

Figure 1:
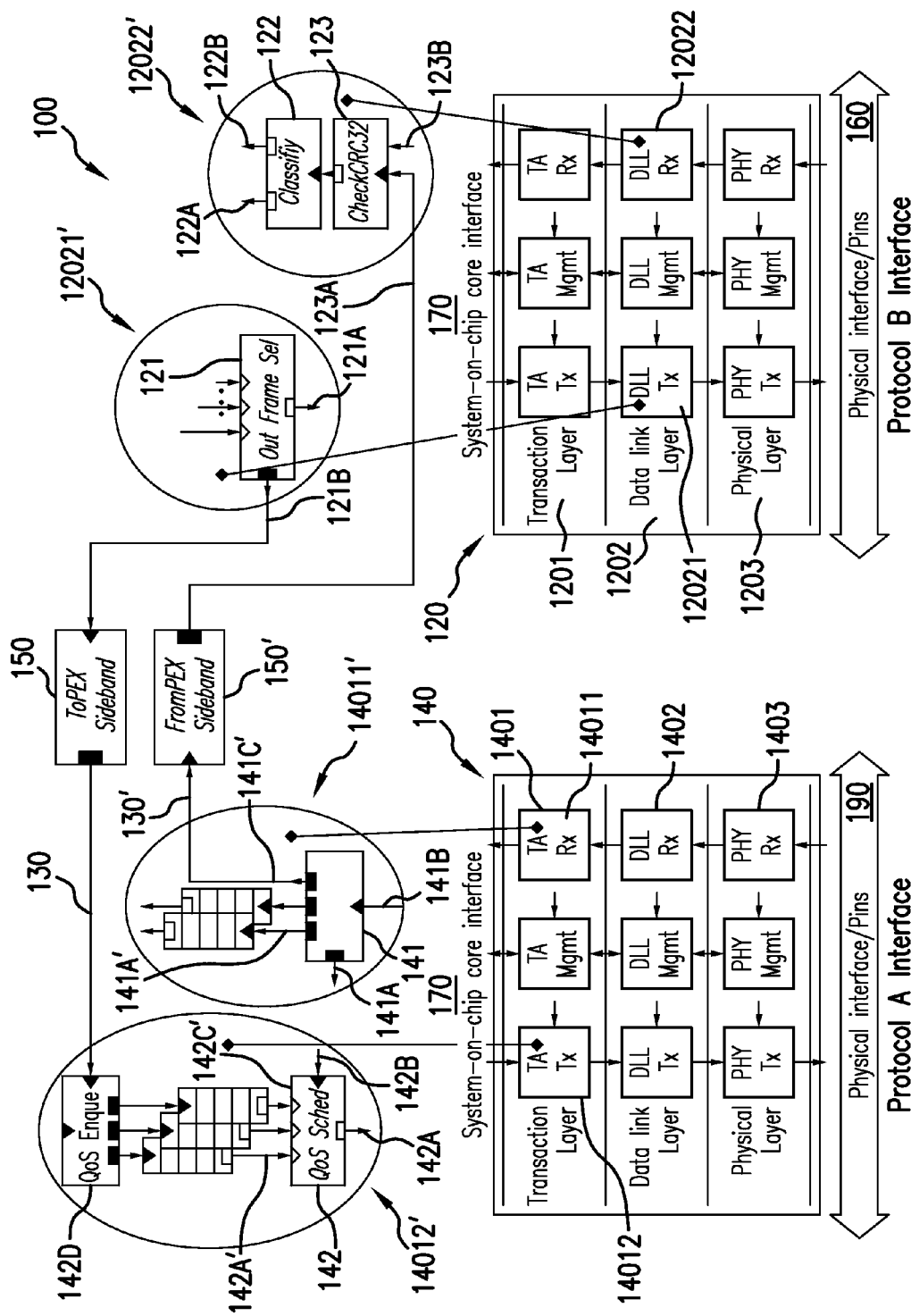
FIG. 1 is a block diagram illustrating an exemplary interconnection of components in a system for implementing an exemplary configuration of the present invention.

As seen in FIG. 1, an exemplary lateral connection between two protocol interface devices is shown. In this example, the Gigabit Ethernet protocol (inner protocol B) is shown tunneling through PCI Express (outer protocol A). In this example, outbound transactions in protocol B, Gigabit Ethernet, are encapsulated following the regular flow of data through the inner Gigabit Ethernet interface. Thus, a system on chip (SOC) core interface at 170 may send instructions or data to the Gigabit Ethernet interface 120. Such commands and/or data which may arrive from the processor, memory, or system bus at the transaction layer 1201 at the TA/Tx (transaction layer, transmit direction) functional block.

The data or instructions received from the core 170 may then be encapsulated or placed in an envelope to facilitate transfer throughout succeeding stages of the network interface device, the network, and a subsequent host machine. The encapsulated packet passes from the transaction layer 1201 TA/Tx block to the data link layer (DLL) 1201, in the DLL Tx 12021 block. Generally, the DLL Tx block 12021 in the data link layer 1202 may perform some processing steps upon the encapsulated data or instruction packet and then forward it on to the physical layer 1203 for transmission to the external physical interface/pins 160. From there, the packet generally proceeds along, for example, a category 5 or category 6 cable of generally unshielded twisted pair though a shielded version may help to alleviate Electromagnetic Interference (EMI) and other such issues. The packet would generally proceed to a network router, switch, hub, device, or to another host, however, herein, the data segment is selectively intercepted or arrested at the DLL Tx block 12021 of the data link layer 1202 before it is passed on to the physical layer (PHY) 1203 where it may be encoded as a series of 0's and 1's for the physical interface 160 where it would actually be transmitted via the external physical transmission medium.

The DLL Tx block 12021 is seen in part in the call out portion 12021' where it is illustrated that the DLL data link layer Tx block 12021, aside from other encapsulation and data link layer processing functions, also contains at least an out frame selector 121 which may include a multiplexer, a switch, or any other device known to be able to selectively route data segments or packets, either to the physical layer 1203 via an outlet 121a or laterally to the lateral connection via outlet 121B. The out frame selector 121 may evaluate header information within the envelope created by the transaction layer 1201, or the data link layer 1202, or may be set independent of the contents of the packets, but may instead be based upon a mode of operation switch which may promiscuously reroute all packets via a sideband or lateral connection 121B. To resume normal functionality, the out frame selector 121 may be set back to a standard mode of operation whereby data segments traversing from the data link layer 1202 will automatically be directed to the physical layer 1203 and ultimately to the physical interface or pins 160.

Out frame selector 121 may accept a plurality of different inputs or different data streams and sequentially route them or selectively route them to their intended destination 121a or 121b. If, for example, a data segment or packet which was addressed to a PCI Express peripheral were to appear at the data link layer 12021, the out frame selector 121 may determine that this is an implicit call for the data segment or packet to be sideband laterally passed via port 121b to arrive at the PCI Express protocol interface 140.

As the data packet is sent out through sideband port 121B of frame selector 121 to the second protocol interface device 140, an intermediate controller 150 may be interposed between the first protocol interface device and the second protocol interface device. This intermediate lateral controller 150 may be used to evaluate parameters, addresses, or properties set in an envelope of the data segment to be selectively copied into an outer envelope for the second protocol interface, such as Gigabit Ethernet. This effectively translates the envelope into the same format as any other regular input into the TA Tx Layer (14012). If, for example, the data segment traversing through the first protocol interface 120 is set with the highest quality-of-service (QOS) parameter, the intermediate lateral controller 150 may determine that quality-of-service parameter and insert it to an outer envelope to thereby indicate the quality-of-service requirements of the inner packet in a form that is readable by the second protocol interface device 140. In some instances, this may be performed in the frame selector 121, or in the transaction layer block 14012 of the second protocol interface device 140. In some instances, depending upon the combinations of protocol interface devices, the parameters may not be directly copied, but instead evaluated, and referenced in a lookup table or other such data structure to form a second parameter corresponding in effect to the first parameter.

The data segment then traverses through the lateral link 130 to a transaction layer transmission block 14012 seen in the callout portion 14012'. A data segment may enter a quality-of-service (QOS) queue into a QOS enqueing function/device 142D which may include a multiplexer, switch, router, or the like. The QOS enqueing function/device 142D may take the data segment or data packet transmitted from the out frame selector 121 and responsive to parameters pre-established or existing in the envelope of the data segment, selectively enqueue the data segment or packet into an existing quality-of-service queue to be processed. Rather than having an entirely fair processing schedule such as a First In, First Out (FIFO) system, it is pragmatically realized that some packets or segments belonging to some applications such as a Voice Over Internet Protocol (VOIP) have a higher priority demand and therefore may be assigned a higher quality-of-service thereof. Therefore, the transaction layer transmit block (TA Tx) 14012, may have a plurality of queues of different priority levels, such as a queue 142A' which may have a lowest priority and may not be accessed until after a higher priority queue is emptied, or may be demoted somewhat in a round robin type approach.

Contrastingly, the queue 142C' may have a high priority and may be serviced as soon as a frame, packet, segment, or the like enters its queue. Thereby, a data segment which may be indicated as having a high priority or a high quality-of-service demand may be initially or automatically sent by the QOS enqueue device 142D to the high priority queue 142C'. The plurality of queues may all then be fed into a QOS scheduler 142 which may include one or a series of multiplexers, along with buffers and other components, to selectively choose an input from a plurality of different queues such as 142A' and 142C' and selectively transmit the received data segment to at least one of: a normal processing path 142A, a transaction layer management portion 142B, or other such destination. In the instance that the data segment is determined to be ready for transmission by the QOS scheduler 142, the data segment or packet will be transmitted through port 142A to the data link layer 1402 for further encapsulation and processing, to the physical layer 1403 for further encapsulation and processing, and potentially transmitted then as a series of 0 and 1 bursts to the physical interface 190 to be transmitted ultimately to another computer, host, location, or device.

As replies are received from the physical interface pins 190, they enter the physical layer 1403 of the second protocol interface 140. Data segments received from the physical layer 1403 may have certain processing performed on them, envelope encapsulation removed, and are then be forwarded to the data link layer 1402. Further processing may be performed upon the data segment received and will be forwarded to the transaction layer 1401. At the transaction layer receive block 14011, an in-frame selector 141 (which may include a multiplexer, a demultiplexer, a selector, or the like) may evaluate packets or segments received through an in port 141B. Segments or packets are evaluated in the in frame selector 141. If it is determined that a segment or packet is a standard packet or segment of the second protocol interface device 140, they may be forwarded on to the system on chip (SOC) interface 170 for further processing and/or storage through, for example, a buffer 141A'. Local transaction-layer packets are sent to 141A.

Alternatively, if the in frame selector 141 determines that the incoming segment received through port 141B is a special segment, perhaps one destined for the first protocol interface device 120, then the in frame selector 141 may selectively route that packet through an output port 141C' which may route through a second lateral connection 130'. The lateral connection 130' may include additional processing to be performed upon a segment or packet 150'. However, the packet or segment ultimately arrives at the data link layer 1202 of the first protocol interface device 120.

At block 12022 (the data link layer receive or DLL Rx block) the data segment or packet is received on port 123A while regular packets are input into port 123B resulting in a combined packet stream. Optionally, the segment is evaluated to ensure, for instance, that a cyclic redundancy code (CRC), hash, or checksum are correct at the check CRC 32 block 123 which may include a controller, microcontroller, adder, or other such suitable logic. The packet may then be forwarded to a classifying module or functional block 122 which may perform further processing upon the packet or data segment and selectively forward it out via port 122A or a port 122B to pass on to either a DLL management block in the data link layer 1202 for instructions, or as substantive data or instructions for a higher layer through the output port 122B being thereby forwarded on to the TA Rx block of the transaction layer 1201. At that point, a further determination—whether an instruction is present for the transaction layer—where it would pass to the TA management block or if it is substantive data, it would then be forwarded on to the system on chip (SOC) core interface 170 for further processing and/or storage.

Thereby, it is seen that a system on chip (SOC) core interface 170 may communicate with an interface device such as the first or second protocol interface device and think that it may be communicating with an entirely different interface device with all the attendant benefits thereof when indeed it is actually communicating through an entirely different protocol interface device, receiving all of the benefits and advantages of that protocol interface device as well. Thereby, the benefits of the first protocol interface are ANDed with the benefits of the second protocol interface and constraints and problems thereof are ameliorated or obviated. Such a solution provides a plurality of benefits, not the least of which is an increased flexibility in addressing suitable systems and networks towards a particular problem or need use-case.

Such lateral transmission may be performed, as discussed above, promiscuously, for all data packets received, responsive to a mode selection switch, responsive to packet/segment/frame inspection, or other such measures. Such lateral transmission interception and injection, may only be performed selectively for selective frames, segments, or packets which may be based on a plurality of factors, such as a source or destination address, or other such tags or metadata. In such a case, a separate set of control frames may be needed and/or these selectively set frames may be addressed merely to a virtual end point such as a fictitious hard drive, video card, host, or the like. The parameters and envelopes for a data packet such as the addressee, the protocol type, the priority or quality-of-service, and other such factors or parameters, may need to be selectively copied from the inner envelope such as the Gigabit Ethernet to the outer envelope, such as the PCI Express to thereby enable the outer or second protocol interface to effectively address the segment or packet based upon the intended recipient or parameters of the first protocol interface. Such dynamically derived information for the outer packet or the second protocol interface device 140 may be derived from a short or shallow packet inspection of the packet traversing the first protocol interface 120.

Alternatively, the parameters for the second protocol interface 140 may be statically derived such that any packet that was selectively transmitted through the out frame selector 121 for a lateral communication may be preset in advance or predetermined such that they will be delivered to a specific address on the second protocol interface 140. Additionally, the quality-of-service, and other such parameters, may be statically or dynamically defined such that they may be assigned a suitable priority relative to their intended purpose or travel.

An address table, look-up table, or other such measures for selectively referencing an inner packet parameter and deriving an outer packet parameter or determining an inner packet parameter and selectively routing through the out frame selector 121 may be prestored into the DLL Tx 12021 module of the data link layer 1202 of the first protocol interface 120. Such table or other measures may be stored in the TA Rx block 14011 of the transaction layer 1401 of the second protocol interface device 140 as well. Inbound segments or packets received on the secondary protocol interface 140 may be classified by the in frame selector 141 which may allow for the dedicated outport 141C to directly transmit the packet or segment to the first protocol interface 120. Alternatively, the encapsulated frame received may be flagged and stored in a regular quality-of-service receive queue or other such buffer or temporary space or the encapsulated frame may be stored in a dedicated receive queue for later push or pull operations before being forwarded or retrieved therefrom.

The storage, buffers, and queues may be arranged or selectively located in other places as would be known to one of skill in the art. For example, the queues, buffers, or the like may be found only at the source node and may be omitted entirely from the receiving end where processing may be sufficient or suitable to happen on the fly without need for buffering such received packets or segments. In certain instances, the pre-established quality-of-service queues or buffers may be re-purposed and utilized rather than providing separate buffers, queues, or the like. Additionally, dedicated buffers may be provided at the intermediate processing blocks 150 and 150', in the data link layer DLL Tx 12021, DLL Rx 12022, the TA Rx 14012, and/or the TA Rx 14011.

Depending upon encapsulation requirements, the insertion and interception points along the different layers may be suitably adjusted and the buffers suitably adjusted as well. Portions of the encapsulation or decapsulation from a first protocol to a second protocol may be performed in-flight through the lateral link 130 (perhaps at the intermediate processing stages 150 or 150'). In the event that such encapsulation or decapsulation is performed in-flight, then the interception and injection points may be suitably adjusted to obviate or include certain encapsulation or decapsulation stages of the multiple layers of the first and/or second protocol interface devices 120 and/or 140. Thereby, outbound frames, packets, or segments may be inserted later in the transmission (Tx) flow and/or the inbound frames may be inserted later into the received (Rx) flow of the inner interface. Additionally, a doubled lateral connection, as seen in FIG. 2, allows for tunneling in both directions.

Figure 7A:
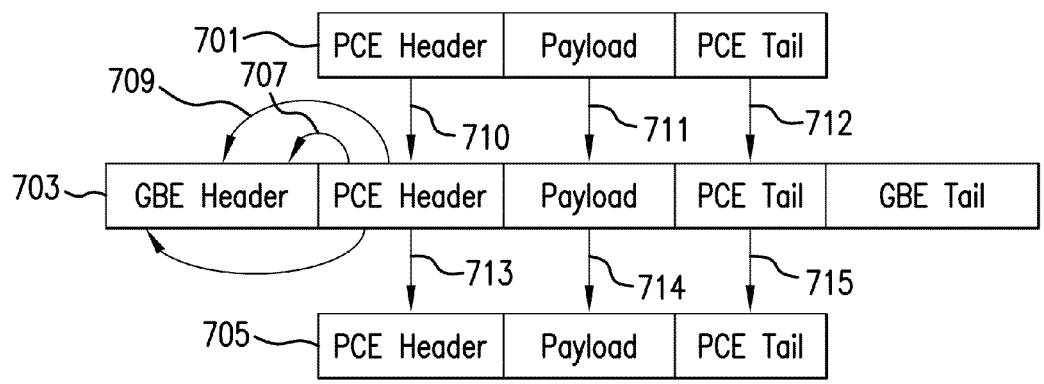
FIG. 7A is an exemplary flow diagram illustrating transformations of data segments throughout the flow of an exemplary system and method in accordance with exemplary configurations of the present invention; and, FIG. 7B is another simplified flow diagram illustrating transformations of data segments throughout the flow of an exemplary configuration of the present invention.

FIG. 7A illustrates an exemplary transformation of a frame, segment, or packet 701 originating at the second protocol interface 140, which, in this exemplary instance, is the PCI Express (PCE) interface device. The frame, segment, and/or packet 701 has a PCE header and a PCE tail with a payload of substantive data stored therebetween. In some cases, the PCE tail may be omitted or the PCE header may be omitted. PCE header and PCE tail generally contain metadata about the payload data such as length, the sender, the recipients, and other such control or instructional information. As the packet 701 is transferred to the second protocol interface 120, in a tunneling configuration, the entirety of the packet 701 is re-encapsulated such that the PCE header is included at a step 710, the payload is included at step 711, and the PCE tail is included at a step 712. Thereby, the entirety of the packet 701 is included and merely encapsulated in an additional Gigabit Ethernet (GBE) header and, potentially, a GBE tail. The PCE header and/or PCE tail may be evaluated for such parameters as the sender, receiver, length, priority and other such parameters. These parameters may then be copied over in a stage 707, 709, and the like, such that the outer Gigabit Ethernet header now has parameters based upon the parameters originally in the PCE header 710. Thereby, the Gigabit Ethernet packet or frame 703 is selectively addressed responsive to the addressing within the PCI Express packet 701.

At a further stage, the Gigabit Ethernet header and tail may be evaluated to direct the Gigabit Ethernet packet 703 to an intended destination. Upon arrival at the intended destination, the Gigabit Ethernet header and/or tail may be stripped off to arrive at a resulting PCE packet 705 which receives the same PCE header 713, payload 714, and PCE tail 715 as were originally transmitted or tunneled through the Gigabit Ethernet protocol.

When the PCE packet 701 exceeds a predetermined maximum length of the payload space of the Gigabit Ethernet packet, a problem known as segmentation may occur whereby the entirety of the PCE packet 701 may not fit in as payload of the Gigabit Ethernet packet 703. In this instance, several solutions may exist such as a partitioning of the PCE packet 701 into a plurality of smaller sub-packets which will then each be encapsulated by the Gigabit encapsulation 703 envelope. A parameter within the Gigabit Ethernet header may be set to indicate that this is perhaps one of two or one of three Gigabit Ethernet packets representing one PCE packet. Conversely, if the PCE packets are relatively small relative to the Gigabit Ethernet packets, a plurality of PCE packets may be encapsulated as one Gigabit Ethernet packet payload with suitable parameters or instructions set in the Gigabit Ethernet header or tail thereof. This allows for suitable reconstruction at the Gigabit Ethernet protocol interface device. To thereby decapsulate, desegment, and reconstruct the PCE packet 701 as they were received by the initial Gigabit Ethernet protocol interface.

Figure 7B:
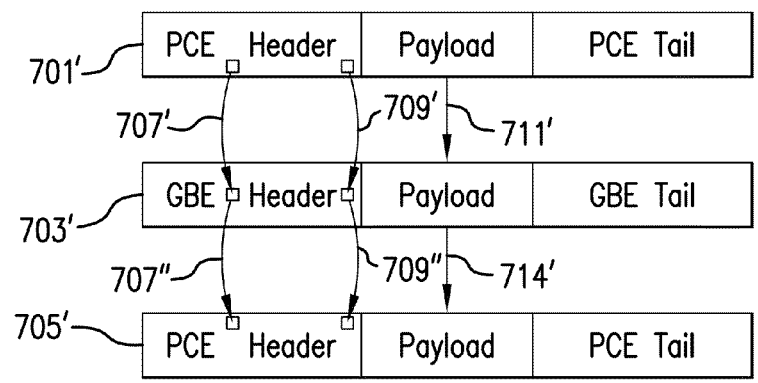

As seen in FIG. 7B, yet another approach known as termination and bridging is illustrated. As seen at block 701', a PCE packet having a PCE header, payload, and PCE tail arrive, or are prepared for transmission across a Gigabit Ethernet link. At this stage, certain portions of information may be copied or derived from the PCE header 707' and 709'. For example, the parameters may be directly copied, or may be evaluated and corresponding parameters in a Gigabit Ethernet header of the Gigabit Ethernet packet 703' may be set based upon the information contained in the PCE header. Such information may be copied over at stages 707' and 709' to the Gigabit Ethernet header. The payload data is generally copied at a stage 711' unchanged and undisturbed. At this point, the original PCE header and PCE tail may be discarded as the Gigabit Ethernet packet 703' has been formed having all of the relevant parameters 707' and 709' and payload data 711' contained therein.

Upon traversal of the Gigabit Ethernet path or link, another termination and bridging will be performed whereby the Gigabit Ethernet header is evaluated for a certain parameter such as 707" and 709" which will then be copied or be used as a starting point to arrive at parameters which should be placed in the PCE header of the new PCE packet 705'. The payload data 714' may generally be copied over unchanged from the Gigabit Ethernet packet 703' into a new payload portion of the PCE packet 705'. At this stage, both the Gigabit Ethernet header and the Gigabit Ethernet tail may be discarded as a newly-formed fully-functional PCE packet 705' containing at least the relevant and necessary parameters and payload data exists.

Turning back to FIG. 2, a block diagram of a computer system employing the disclosed system and method is illustrated. A computer system 200 contains a processor unit 202, a main or primary memory 204, an interconnect bus 206, a mass storage device 208, peripheral device(s) 210, input control device(s) 212, portable storage drive(s) 214, a graphics subsystem 216, and an output display 218, amongst other components. Processor unit 202 may include a single microprocessor or a plurality of microprocessors for configuring computer system 200 as a multi-processor system. Main memory 204 stores, in part, instructions and data to be executed by processor 202. Main memory 204 preferably includes banks of dynamic random access memory (DRAM) as well as high-speed cache memory at various levels of the system architecture.

For the purpose of simplicity, the components of computer system 200 are connected via interconnect bus 206. However, computer system 200 may be connected through one or more data transport means. Mass storage device 208, which may be implemented with a magnetic disk drive, an optical disk drive, a solid state device, an attachment to network storage, and the like, is preferably a non-volatile storage device for storing data, databases, and instructions, to be used by processor unit 202. In certain configurations, mass storage device 208 may store portions of the software to load it into main memory 204 or into a firmware of one or both protocol interface devices 220 and 240 and/or lateral communication controller 250.

Portable storage medium drive 214 operates in conjunction with a portable non-volatile storage medium such as a floppy disk, a compact disk read only memory (CD-ROM), or a digital versatile disk read only memory (DVD-ROM), to input and output data and code to and from the computer system 200. In one configuration, software portions are stored on such a portable medium, and are input to computer system 200 via portable storage medium drive 214. Peripheral device (s) 210 may include any type of computer support device such as an input/output (I/O) interface, to add additional functionality to computer system 200. For example, peripheral device (s) 210 may include additional network interface cards to interface computer system 200 to additional networks.

Input control device(s) 212 provide a portion of the user interface for a computer system 200 user. Input control device (s) 212 may include an alphanumeric keypad for inputting alphanumeric and other key information; and a cursor control device such as a mouse, a track pad or stylus; or cursor direction keys.

In order to display textual and graphical information, computer system 200 contains graphic subsystem 214 and output display(s) 218. Output display 218 may include a cathode ray tube (CRT) display, liquid crystal display (LCD), plasma display, projector, or the like. Graphic subsystem 216 receives textual and graphical information and processes the information for output to display 218.

In a software implementation, the portions of software for certain measures may include a plurality of computer executable instructions, to be implemented on a computer system. Prior to loading in the computer system or firmware, the software may reside as encoded information on a computer-readable tangible medium such as a magnetic floppy disk, a magnetic tape, CD-ROM, DVD-ROM, flash memory, or any other suitable computer readable medium. Such software may control multiplexors, selectors, field programmable gate arrays (FPGAs), or the like to implement logical control and selectivity features.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

While the above disclosure has focused primarily on an exemplary configuration containing a first and a second protocol interface device, any number of protocol interface devices may be used such as two or three different protocol interface devices being coupled to, for example, a master Gigabit Ethernet or a master backplane PCI Express protocol interface through a series of lateral connection controllers disposed therebetween.

A plurality of hosts may be laterally interconnected such as through a first protocol interface coupled to a second protocol interface in a first host and a corresponding third protocol interface being coupled to a fourth protocol interface within a second host.

The use of Gigabit Ethernet and PCI Express throughout has been merely exemplary and any type of interface device may be used. Additionally, any number of variations of the location of one or more lateral connection controllers may be realized. For example, the lateral connection controller may be disposed in the first protocol interface device, in the second protocol interface device, in a host system, intermediate between the two interface devices, such as, for example, midstream in the lateral connection, and the like. Any suitable location may be employed. Indeed, the processing logic workload may be distributed in offloaded fashion amongst a plurality of controllers, processors, and the like.

Additionally, the amount and arrangement of logic gates may be altered to suit the type of implementation—or dynamically configured through the use of a field programmable gate array (FPGA) type device with a rom or firmware containing instructions for the FPGA to emulate an Application Specific Integrated Circuit (ASIC). Alternatively, the to/from modules may be implemented in a certain processing code embedded in rom or firmware on a dedicated or shared processing element which would provide greater flexibility in protocol processing/encapsulation. Sideband information and data may be streamed through the processor(s) via a register interface (queue) or could be stored and mapped into a local memory (memory interface). Additionally, the connections may be implemented through shared memory and/or registers with a suitable exchange of pointers.

The to/from modules in, for example, the PCI Express interface device may be implemented in dedicated hardware having a dedicated function with some degree of configurability (such as in registers and data dependent behavior). Sideband information as extra signals, sideband information as streaming header, separate registers, mode switch, multiplex selector code signals, and the like may be utilized to effect selectivity in processing. Rather than adding additional multiplexers or selector hardware, potentially, existing multiplexers or hardware may be modified or enlarged, such as, for example, where a 3 to 1 de/multiplexer may have been utilized for other purposes, an enlarged 4 to 1 or a 3 to 2 de/multiplexer may be employed; or a series of nested de/multiplexers may be utilized to arrive at the enlarged de/multiplexor for certain configurations.

Additionally, the lateral connection may be implemented using a central processor and software driver stacks running thereon and utilizing at least one of the protocol interface devices for protocol-specific processing. For example, the first protocol interface may address packets, perform processing thereon and forward the packet, not through the external physical medium, but back through the central processor or controller to the second protocol interface for additional processing and transmission through its external physical medium. In such a configuration, the two processors of the two protocol interface devices are utilized in concert with a central processing unit but would have the disadvantage of burdening the system bus and system processor to a certain extent. To ameliorate such disadvantages, an exemplary configuration may take advantage of transmission control protocol offload engines (TOE or TCPOE) to selectively balance and offload a portion of the processing burden from the central processor to a dedicated hardware for handling encapsulation/decapsulation, checksum, sequencing, sliding window transmissions, handshakes, terminations, and the like. The TOE-type concept of dedicated hardware offload for often-used predefined protocol functions may be utilized for any protocol utilized herein.

An exemplary flow of such a configuration may be Application (executing on processor) to protocol A driver (on processor) to system bus to protocol A IO module to system bus to lateral driver (on processor) to system bus to protocol B IO module. Alternatively, a direct routing across the system bus flow includes: Application (on processor) to protocol A driver (on processor) to system bus to protocol A IO module to system bus to protocol B IO module.

Although this invention has been described in connection with specific forms and configurations thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of circuit design and implementation flows and processing steps may be reversed, interposed, or combined, all without departing from the spirit or scope of the invention as defined in the appended Claims.

What is claimed is:

1. A system for lateral tunneling with bypass of an external network from a first protocol interface device to a second protocol interface device, the system comprising:
    a first protocol interface device and a second protocol interface device, said first and second protocol interface devices being respectively operably coupled to a first and second external physical transmission media; and,
    at least one lateral connection controller intercoupling said first and second protocol interface devices, said lateral connection controller intercepting data segments within said first protocol interface device prior to transmission to the first external physical transmission medium by rerouting the intercepted data segments to bypass a system bus and a central processing unit (CPU), and converting the intercepted data segments for transmission by said second protocol interface device to the second external physical medium;
    wherein at least one of the first and second protocol interface devices is configured according to an input/output communication protocol for a peripheral device.

2. The system as recited in claim 1, wherein the intercepted data segments are injected into a memory of said second protocol interface device.

3. The system as recited in claim 1, further comprising a host coupled to said second protocol interface device via said second external physical transmission medium, said host including a third and a fourth protocol interface device, said third and fourth protocol interface devices coupled via a second lateral connection controller.

4. The system as recited in claim 1, wherein said lateral connection controller selectively intercepts data segments responsive to a mode selection command.

5. The system as recited in claim 1, wherein said lateral connection controller selectively reroutes the intercepted data segments responsive to an evaluation of the intercepted data segments by said lateral connection controller.

6. The system as recited in claim 5, wherein said lateral connection controller encapsulates at least one of the intercepted data segments in an envelope of a protocol compatible with said second protocol interface device.

7. The system as recited in claim 6, wherein said lateral connection controller selectively sets at least one parameter of the envelope based upon an evaluation of the intercepted data segments.

8. The system as recited in claim 1, wherein the lateral connection controller reroutes the intercepted data segments to said second protocol interface device to bypass the first external physical transmission medium.

9. The system as recited in claim 1, wherein the intercepted data segments are rerouted to bypass a main memory.

10. The system as recited in claim 1, wherein the intercepted data segments from said first protocol interface device are transmitted through said second external physical transmission medium coupled to said second protocol interface device.

11. The system as recited in claim 1, wherein an output protocol of said first protocol interface device is different from an output protocol of said second protocol interface device.

12. The system as recited in claim 11, wherein said first and second protocol interface devices are selected from the group consisting of PCI Express (PCE) and Gigabit Ethernet (GbE).

13. The system as recited in claim 1, wherein the intercepted data segments are rerouted from said first protocol interface device with bypass of at least one networking layer of at least one of said protocol interface devices.

14. The system as recited in claim 13, wherein the intercepted data segments are rerouted to bypass at least a physical layer of said first protocol interface device.

15. The system as recited in claim 14, wherein the intercepted data segments are rerouted to bypass at least a physical layer of said second protocol interface device.

16. The system as recited in claim 15, wherein the intercepted data segments are rerouted to further bypass a data link layer of said second protocol interface device.

17. The system as recited in claim 1, wherein said lateral connection controller includes at least a multiplexer and a buffer operable to store the intercepted data segments.

18. The system as recited in claim 17, wherein said lateral connection controller further includes a checksum controller operable to determine errors in the intercepted data segments.

19. The system as recited in claim 1, wherein a central processing unit (CPU), a main memory, said first protocol interface device, said second protocol interface device, and said lateral connection controller are disposed within a system-on-chip (SOC).

20. The system as recited in claim 1, wherein said lateral connection controller is disposed within said first protocol interface device, and said lateral connection controller includes an internal connection coupling said first and said second protocol interface devices.

21. The system as recited in claim 1, wherein a first lateral connection controller is disposed within said first protocol interface device, and a second lateral connection controller is disposed within said second protocol interface device, and said second controller includes an internal connection coupling said first and said second lateral connection controllers.

22. A method for lateral tunneling with bypass of an external network from a first protocol interface to a second protocol interface, the method comprising:
  establishing a system to include a first and a second protocol interface device, said first and second protocol interface devices being operably coupled to a first and second external physical transmission media respectively;
  providing at least one lateral connection controller to intercouple said first and second protocol interface devices with bypass of at least one of the first and second external physical transmission media;
  intercepting data segments by said lateral connection controller of said first protocol interface device prior to transmission thereof to the first external physical transmission medium by rerouting the intercepted data segments to bypass a system bus and a central processing unit (CPU); and,
  converting the intercepted data segments for said second protocol interface device;
  wherein at least one of the first and second protocol interface devices is configured according to an input/output communication protocol for a peripheral device.

23. The method as recited in claim 22, wherein the intercepted data segments are injected into a memory of said second protocol interface device.

24. The method as recited in claim 22, further comprising establishing a host coupled to said second protocol interface device via the second external physical transmission medium, said host including a third and a fourth protocol interface device, said third and fourth protocol interface devices being intercoupled via a second lateral connection.

25. The method as recited in claim 22, further comprising selectively actuating said lateral connection to intercept data segments responsive to a mode selection command.

26. The method as recited in claim 22, further comprising selectively actuating said lateral connection controller to reroute the intercepted data segments responsive to an evaluation thereof.

27. The method as recited in claim 26, further comprising encapsulating at least one of the intercepted data segments in an envelope by said lateral connection controller according to said second protocol interface device.

28. The method as recited in claim 27, further comprising selectively setting at least one parameter of the envelope by said lateral connection controller based upon an evaluation of the intercepted data segments.

\* \* \* \* \*

UNITED STATES PATENT AND TRADEMARK OFFICE
CERTIFICATE OF CORRECTION

| | | |
|---|---|---|
| PATENT NO. | : 9,203,895 B1 | Page 1 of 1 |
| APPLICATION NO. | : 13/692572 | |
| DATED | : December 1, 2015 | |
| INVENTOR(S) | : Christian Sauer, Hans-Peter Loeb and Frank Martin | |

It is certified that error appears in the above-identified patent and that said Letters Patent is hereby corrected as shown below:

In the claims

In claim 1, on column 16, lines 33-34, delete "coupled to a first and second external physical transmission media" and replace with --coupled to first and second external physical transmission media--

In claim 22, on column 18, lines 10-11, delete "coupled to a first and second external physical transmission media" and replace with --coupled to first and second external physical transmission media--

Signed and Sealed this
Eighth Day of March, 2016

Michelle K. Lee
*Director of the United States Patent and Trademark Office*